United States Patent [19]

Achterholt

[11] Patent Number: 4,606,391
[45] Date of Patent: Aug. 19, 1986

[54] VALVE CAP WITH PRESSURE DROP INDICATION FOR PNEUMATIC TIRES

[76] Inventor: Rainer Achterholt, Paul-Zoll-Str. 3, 8963 Waltenhofen, Fed. Rep. of Germany

[21] Appl. No.: 665,311

[22] Filed: Oct. 26, 1984

[30] Foreign Application Priority Data

Oct. 28, 1983 [DE] Fed. Rep. of Germany ....... 3339095
Jun. 19, 1984 [DE] Fed. Rep. of Germany ....... 3422725

[51] Int. Cl.$^4$ ............................................. B60C 23/04
[52] U.S. Cl. .................................. 152/431; 73/146.8; 116/34 R; 137/227; 137/557; 138/89.2; 188/67; 188/83
[58] Field of Search .............. 152/431, 428, 427, 429; 73/709, 146.8; 116/34 R, 268; 138/89.2, 104; 137/227, 557; 285/93; 188/67, 83; 81/15.4

[56] References Cited

U.S. PATENT DOCUMENTS

| 1,322,884 | 11/1919 | Edelmann | 73/709 |
| 2,618,977 | 11/1952 | Hottenroth | 116/34 R X |
| 3,779,080 | 12/1973 | Smith | 73/709 |
| 4,196,690 | 4/1980 | Alinari | 73/709 X |
| 4,362,121 | 12/1982 | Pegram | 116/34 R |
| 4,520,664 | 6/1985 | Kramer | 73/146.8 |

FOREIGN PATENT DOCUMENTS

| 396474 | 5/1924 | Fed. Rep. of Germany . |
| 2212130 | 9/1973 | Fed. Rep. of Germany . |
| 2627529 | 12/1977 | Fed. Rep. of Germany . |
| 3104081 | 12/1981 | Fed. Rep. of Germany . |
| 64792 | 12/1955 | France . |
| 27686 | of 1911 | United Kingdom . |

*Primary Examiner*—Lois E. Boland
*Assistant Examiner*—Thomas Bokan
*Attorney, Agent, or Firm*—Leydig, Voit & Mayer, Ltd.

[57] ABSTRACT

The disclosure describes a valve cap which indicates the pressure within a pneumatic tire. The valve cap comprises a sleeve which may be mounted on the valve tube of the pneumatic tire and which includes an actuating member for opening a valve within the valve tube when the sleeve is mounted on the valve tube; a compressed-air chamber within the sleeve which communicates with the interior of the tire through the open valve and which includes a movable wall structure, such as a diaphragm or a piston, that seals the compressed-air chamber relative to ambient pressure and that moves in a first axial direction in response to an increase in pressure in the compressed-air chamber; an indicator mounted for axial movement within the sleeve and actuated by the diaphragm or piston; a marking member cooperatively arranged with the indicator for movement in the first axial direction through the sleeve; a return movement inhibitor associated with the marking member for inhibiting movement of the marking member; and a spring cooperating with the indicator and biased toward the opposite axial direction whereby an increase in pressure in the compressed-air chamber axially moves the indicator and marking member in the first axial direction relative to the sleeve and a decrease in the compressed-air chamber axially moves the indicator in the opposite axial direction relative to the sleeve while the return movement inhibitor retains the marking member in its position relative to the sleeve.

25 Claims, 8 Drawing Figures

VALVE CAP WITH PRESSURE DROP INDICATION FOR PNEUMATIC TIRES

The present invention relates to a valve cap for pneumatic tires and, in particular, to a valve cap for indicating the air pressure in pneumatic tires.

German Laid-Open Patent Application No. 26 27 529 discloses one example of known valve caps which indicate pressure. The indicating means of this example comprises the actual indicator, viz. of a rotatable disc which is provided with a projecting lug and secured to a shaft which with laterally projecting pins engages a thread of a hollow actuator. An axial displacement of the actuator caused by the diaphragm of a compressed-air chamber which communicates with the interior of the tire causes a corresponding pivoting of the lug of the disc. A rotary ring having a marking lug is adjustably provided on the circumference of a sleeve threadable onto the valve tube. After threading of the known valve cap onto the valve tube, the tire pressure is also applied to the compressed-air chamber. The diaphragm expanding as a consequence thereof elevates the actuator, the shaft being rotated until the pressure and the spring force are balanced. Thereupon, the marking lug has to be rotated manually so that it registers with the lug of the disc. When the tire pressure drops, the actuator causes rotation of the shaft with corresponding pivoting of the lug of the disc. The resultant angle of rotation between the two lugs is a measure of the pressure loss.

As such valve caps have a diameter of only approx. 10 mm and a length which is approximately twice the diameter, there is only little room for built-in components. Consequently, the mechanism for converting the axial movement into a rotary movement requires high precision and is susceptible to failure. Above all, it is a drawback that the marking lug, which by nature is relatively small, has to be moved into register with the disc lug manually on the valve cap which has already been threaded onto the tire valve—and is therefore not readily accessible. Failure to renew the adjustment of the marking ring after each measurement of the tire pressure will lead to a false indication.

It has already been known to provide in a tire pressure gauge a return movement inhibitor for the indicator (cf. German Pat. No. 396 474). Therein the indicator comprises a ratchet mechanism merely permitting extension of the indicator but preventing return movement thereof. The pressure gauge has to be removed from the valve tube before the indicator can be returned to its initial position after actuation of a spring.

Furthermore, from the German Laid-Open Patent Application No. 31 04 081 a pressure gauge for pneumatic tires has been known in which the actual tire pressure is indicated by the state of an inflatable diaphragm. To this end, one end of a sleeve which is threadable onto the tire valve is hermetically sealed with a cup made of a transparent material. A pressure-dependent deformation of the diaphragm is visible through this transparent cup, and the viewer infers the air pressure of the tire from the degree of deformation of the diaphragm.

It is an object of the present invention to provide a valve cap which is of simpler structure and more reliable than the valve cap disclosed in German Pat. No. 26 27 529 and in which the marking member may more easily be moved into a defined initial position relative to the indicator.

It is a further object of the present invention additionally to ensure that escape of air from the tire is prevented if air begins leaking from the compressed-air chamber, for example, because the diaphragm is damaged.

According to the invention these objects are achieved by a valve cap comprising a sleeve which may be mounted on the valve tube of a pneumatic tire, e.g., threaded onto the valve tube, and which includes an actuating member for opening a valve within the valve tube when the sleeve is mounted on the valve tube; a compressed-air chamber within the sleeve which communicates with the interior of the tire through the open valve and which includes a movable wall structure, such as a diaphragm or a piston, that seals the compressed-air chamber relative to ambient pressure, the movable wall structure moving in a first axial direction in response to an increase in pressure in the compressed-air chamber; an indicator mounted for axial movement within the sleeve and actuated by the diaphragm or piston; a marking member cooperatively arranged with the indicator for movement in the first axial direction through the sleeve; a return movement inhibitor associated with the marking member for inhibiting movement of the marking member; and a spring cooperating with the indicator and biased toward the opposite axial direction whereby an increase in pressure in the compressed-air chamber axially moves the indicator and marking member in the first axial direction relative to the sleeve and a decrease in pressure in the compressed-air chamber axially moves the indicator in the opposite axial direction relative to the sleeve while the return movement inhibitor retains the marking member in its position relative to the sleeve.

As compared with the proposal prior known from the German Laid-Open Patent Application No. 26 27 529 the structure of the valve cap according to the invention is simpler due to the omission of a converting mechanism. If at all necessary—the marking member is axially pushed in against the abutment before the valve cap is threaded onto the valve tube of the inflated tire. The setting operation may be performed practically without looking and requires no special attention. After threading-on of the valve cap, the indicator automatically moves the marking member into its initial position. As far as the actuating member provided on the sleeve keeps the valve mounted in the valve tube of the tire always in its open position, the valve cap threaded onto the tire valve need not be manipulated. If the tire pressure drops, solely the indicator is moved towards the actuating member under the action of a spring while the return movement inhibitor continues to retain the marking member in its initial position. This results in a variation of the relative axial distance of both members which may be used for indicating a pressure loss. In particular when the colors of the two members are different, this variation of the axial distance is easily recognizable even from a greater distance.

In the valve cap according to the invention the return movement inhibitor may also operate in a positive manner, e.g. according to the ratchet principle known from the German Pat. No. 396 474. However, a simpler and superior alternative is to configure the return movement inhibitor as a non-positive brake which according to a further embodiment of the invention consists of an elastically deformable ring through which the indicator extends with a clearance whereas the marking member extends therethrough in frictional engagement. In this case the ring may close the end face of the sleeve so that an additional end plate may be omitted.

Although the indication is preferably provided at the end face of the sleeve, it may alternatively also be provided on the sleeve circumference. For instance, two adjacent axial slots may be provided one of which has a lug of the indicator extending therethrough while in the other axial slot a lug of the marking member is guided. Both lugs are in engagement with the sleeve interior in the path of movement of an actuator operated by the diaphragm. When pressure is applied to the compressed-air chamber, the diaphragm displaces the actuator, and the actuator takes both lugs along—against the action of the spring—until both the indicator and the marking member are in the position corresponding to the tire pressure. When the tire pressure drops, the indicator under the action of the spring follows the corresponding displacement of the diaphragm or piston, respectively, while the marking member is retained in its initial position by the return movement inhibitor.

In a preferred embodiment the end of the sleeve which is remote from the valve may be hermetically sealed by a hat-shaped cover of a transparent material permitting extension of the indicator and the marking member if additionally, upon complete pressure relief of the compressed-air chamber, a return movement of the marking member is possible.

As the hat-shaped cover hermetically seals the end of the valve cap which is remote from the valve, air will be prevented from escaping from the pneumatic tire equipped with such a valve cap even if the diaphragm or piston, respectively, is destroyed or the sealing between the diaphragm and the sleeve is damaged. The hat-shaped cover is made of a transparent material and further shows the mutual displacement of the indicator and the marking member to indicate any pressure drop in the tire.

The hat-shaped cover may comprise a hat portion and a tubular portion integrally formed therewith, and the tubular portion may be inserted into the valve sleeve. In such a case the outer wall of the tubular portion is preferably welded to the inner wall of the sleeve at least in a continuous annular zone so as to ensure hermetic sealing of the valve cap.

This tubular portion may be of such a length that the open end of the tubular portion urges the peripheral bead of the diaphragm against a transverse wall or against an inwardly projecting extension of the sleeve. Thus, the tubular portion may additionally act as a retaining member for the diaphragm, whereby an independent and separate component therefor may be omitted.

According to a further advantageous embodiment the hat portion of the cover may substantially have the configuration of a hollow cone portion slightly flaring towards the tubular portion. The outward movement of the indicator finally urges the end of the marking member which is remote from the valve against the inner wall of this hat portion when the marking member adopts its initial position. In this initial position the marking member is retained by this inner wall and, respectively, held thereby in frictional engagement. Thus, the inner wall of the hat portion may additionally act as the return movement inhibitor so that an independent, separate component therefor may be omitted as well. Consequently, the number of separate components is reduced, whereby especially mass production of the valve cap is facilitated and made more inexpensive.

In the case of a closed valve cap there must also be provided a possibility of returning the marking member from its initial position so that the valve cap need not be discarded after single use. In the simplest case this possibility of return may be ensured by a sufficient bulk of the marking member. For returning the marking member, the valve cap is unscrewed from the valve and several times tapped against a hard base until the marking member has moved back again.

Alternatively, the displacement of the indicator which takes place under the action of the spring upon complete pressure relief of the compressed-air chamber may also automatically cause an at least partial return movement of the marking member. To this end, the marking member may be formed with an axially extending, elongated recess for engagement of a projection fixedly connected to the indicator. Upon complete pressure relief of the compressed-air chamber, the spring returns the indicator and the projection engages the end of the recess and takes the marking member along for releasing it from its force-fit with the return movement inhibitor and for returning it at least partially. The length of the recess in the marking member is sufficient to permit upon a mere reduction in tire pressure a partial return of the indicator without returning the marking member from its initial position. If required, a complementary arrangement with a projection at the marking member which engages in an elongated recess in the indicator may also be provided.

In a particularly preferred embodiment of the valve cap according to the invention the indicator substantially is a rod portion which has at one end thereof a disc-shaped projection serving as a spring seat. In the axial direction the rod portion is formed with a slot into which a small plate acting as a marking member and being movable relative to the rod portion is inserted, the dimensions of said plate substantially corresponding to the length and width of the slot. However, in the region of the end face of the rod portion this small plate is provided with two opposed extensions projecting beyond the cross-section of the rod; when the indicator has moved the marking member into its initial position, said extensions may engage the inner wall of the transparent, hat-shaped cover, where they retain the marking member in frictional engagement or in force-fitted relationship respectively. In this embodiment preferably an elongated slot is formed within the small plate, and a lug projecting into the slot or a pin bridging this slot extends into this elongated slot and upon complete return of the indicator returns the marking member at least partially.

Although preferably the expandable diaphragm or the displaceable piston directly acts on the indicator or a component integrally formed therewith, an actuator may alternatively be provided onto which the diaphragm or piston, respectively, applies a load and which, in its turn, actuates the indicator. Such an actuator may functionally or non-positively be connected to the diaphragm or piston, respectively. Alternatively, the actuator may constitute an independent, separate component. In any case, the actuator transmits the axial displacement of the diaphragm or piston occurring upon application of pressure on the compressed-air chamber to the indicator and axially displaces the latter—together with the marking member—relative to the sleeve against the action of the spring. If required, an active actuator may be provided converting a predetermined axial displacement of the diaphragm or pistion, respectively, into a multiple axial displacement of the indicator. Such an active actuator may e.g. consist of a bell-crank mechanism which is suitably linked within the sleeve. Furthermore, the actuator may functionally or non-positively, in particular integrally be joined to the indicator.

Within the sleeve of the valve cap an actuating member is provided which is adapted to open the tire valve mounted in the valve tube when an internal threaded portion of the sleeve has been threaded onto the external threaded portion of the valve tube, until the sleeve is in its operative position. This actuating member may be in the form of a projection which is fixedly provided within the sleeve and which always keeps the valve mounted in the valve tube in the open position when the sleeve is in the operative position.

Alternatively, this actuating member may be a pin which is provided within the sleeve so as to be axially movable and the controlled actuation of which opens the valve mounted in the valve tube—when the sleeve is in its operative position. For actuation, there may e.g. be provided a lever one end of which is linked to the pin and the other end of which extends beyond the circumference of the sleeve and is sealed relative to the latter. By pivoting this extended lever end an operator may open the tire valve in a controlled way. With this embodiment or with an embodiment operating similarly the tire valve mounted in the valve tube is kept open as long as the lever or the like is actuated.

For increasing the tightness between the valve tube of the tire and the threaded-on sleeve, a sealing ring may be provided within the sleeve, said sealing ring being adapted to be clamped between a transverse wall or an inwardly projecting, continuous shoulder of the sleeve and the end face of the valve tube.

In the following the invention will be described in detail with reference to the drawing, in which.

Figure 1:
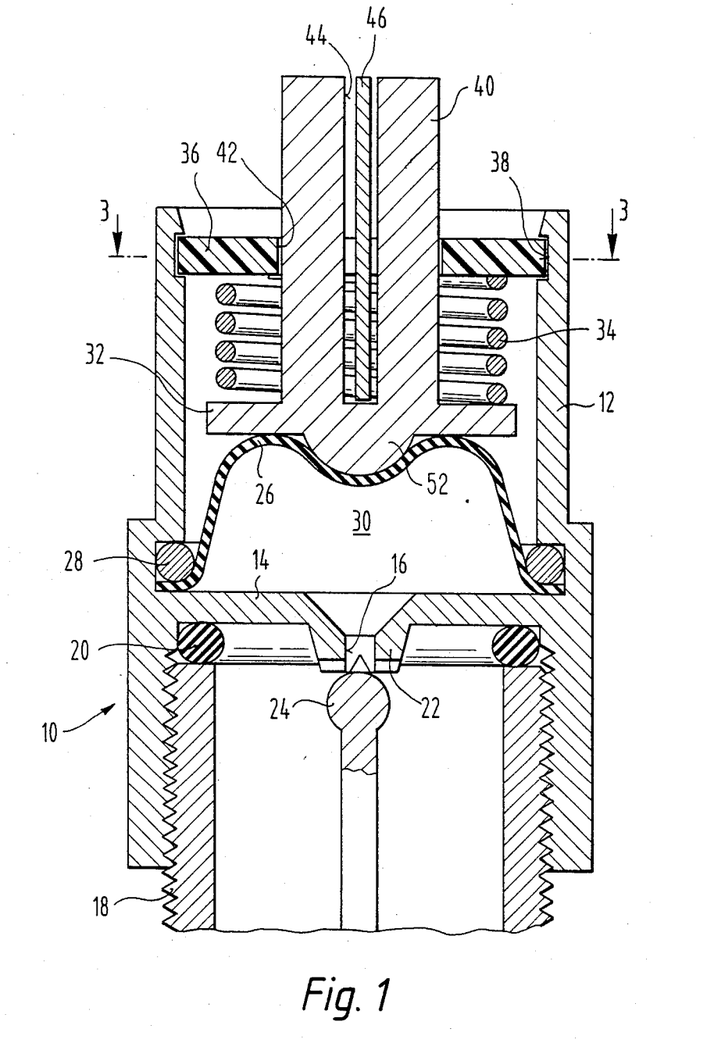
FIG. 1 is a sectional view of an embodiment of the valve cap according to the invention in its operative position (without pressure drop in the tire)
Figure 2:
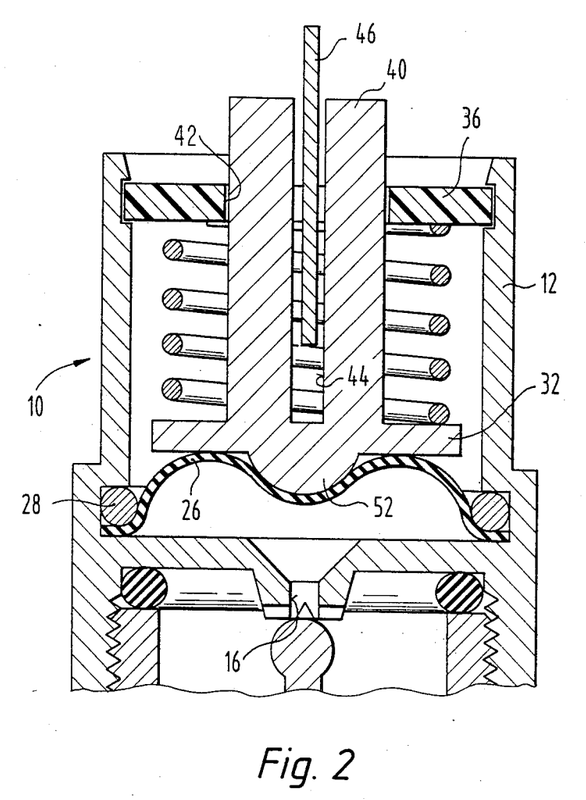
FIG. 2 is a sectional view analogous to FIG. 1 but indicating a pressure drop in the tire.
Figure 3:
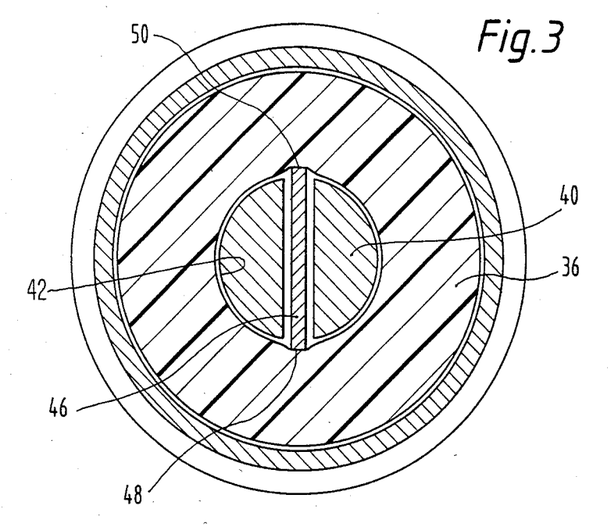
FIG. 3 is a sectional view of a valve cap along line 3—3 of FIG. 1.

The essential parts of the valve cap illustrated in FIGS. 1, 2 and 3 include the sleeve 12 of the valve cap, the diaphragm 26, the indicator 40, the spring 34, the marking member 46 and the return movement inhibitor 36 of this marking member 46. The sleeve 12 of the valve cap 10 illustrated in FIG. 1 is provided approximately in its longitudinal center with a transverse wall 14 having a central bore 16 with an upward conical flare. The lower part of the sleeve 12 is provided with an internal thread with which the valve cap 10 may be threaded onto the schematically illustrated valve tube 18. A sealing ring 20 clamped between an annular shoulder of the sleeve 12 and the end face of the valve tube 18 provides hermetic sealing of the valve cap 10 relative to the valve. In this threaded-on (operative) position of the sleeve 12 a projection 22 projecting downwardly from the transverse wall 14 operates the valve rod 24 in the valve tube 18 and always keeps this valve open so that the pressure in the tyre act on the compressed-air chamber 30 thereabove through the bore 16. In the shown embodiment the compressed-air chamber 30 is defined by the transverse wall 14, on the one hand, and by a diaphragm 26, on the other hand, the edge of the diaphragm being hermetically retained in a circumferential groove of the sleeve 12 by means of a spring washer 28.

Alternatively, this diaphragm 26 may be replaced by a piston which is fitted in the sleeve so as to be axially movable, an O-ring which is inserted in a circumferential groove of the piston ensuring hermetic sealing of the compressed-air chamber relative to ambient pressure.

In any case, the compressed-air chamber 30 communicates with the interior of the tire through the bore 16 and the valve tube 18 so that the tire pressure also exists within the compressed-air chamber 30 as long as the valve rod 24 is depressed.

A substantially rod-shaped indicator 40 is provided at its lower end with a disc 32 engaging the upper side of the diaphragm 26. The projecting edge of the disc 32 forms a spring seat for a coil spring 34. The opposite end of the spring 34 is supported by a rigid ring which, however, is elastically somewhat deformable and is inserted in a circumferential groove 38 in the inner wall at the upper end of the sleeve 12. A rod-shaped portion forming the indicator 40 integrally projects upwardly from the disc 32. This rod-shaped portion extends with sufficient radial clearance through the bore 42 in the inserted ring 36 so that this ring 36 guides the indicator 40 while permitting free axial movement thereof.

The rod-shaped portion of the indicator 40 is formed with an axially extending slot 44 which may extend to the level of the disc 32. This axial slot 44 accommodates a marking member 46 with sufficient lateral clearance for a free, relative axial movement. The length of the marking member 46 corresponds to the length of the axial slot, and this length amounts to a multiple of the width of the marking member 46—as viewed rectangularly to the plane of projection. This width of the marking member, in its turn, amounts to a multiple of the thickness of the marking member 46. In the illustrated embodiment the marking member 46 is a thin small plate of rectangular configuration. The width of this marking member 46 is slightly greater than the diameter of the indicator 40 so that the marking member protrudes on either side with its parallel longitudinal edges from the axial slot 44 and projects beyond the circumference of the indicator 40. The width of the marking member 46 is also greater than the internal diameter of the bore 42 of the ring 36 so that the latter is elastically deformed in the region of the vertical end faces of the marking member 46, viz. urged outwardly as indicated at 48 and 50 in FIG. 3.

After threading of the valve cap 10 onto the valve tube 18, the tire pressure is applied to the compressed-air chamber 30, and the resultant displacement of the diaphragm moves the upper portion of the indicator 40 beyond the upper end of the sleeve until the spring 34 produce a corresponding counterforce.

The valve cap according to the invention may be used with one and the same spring for practically all, but at least for most of the vehicles in use, viz. within a pressure range from 1.5 bar to 3 bar. A somewhat stronger spring may be used for bicycle tires in view of the pressures in the order of 4 bar. By correspondingly dimensioning the diaphragm and the spring it is also possible to provide an embodiment of the valve cap which is suited for truck tires.

Depending on the tire pressure, a state of equilibrium is established between the compressive force of the elastic diaphragm 26 defining the compressed-air chamber 30 and the force of the spring 34; the upper portion of the indicator 40 is extended beyond the upper end of the sleeve 12 to a corresponding extent. What is essential is that without any intervention by an operator the marking member 46 is automatically moved into its initial position depending on the actual tire pressure because this marking member 46 is taken along by the indicator. The marking member 46 is always retained by the elastic ring 36 to such a degree that any undesired or independent displacement of the marking member 46 is inhibited. During upward movement of the indicator 40 the displacing force of the diaphragm 26 is sufficient to overcome the frictional forces between the marking member 46 and the elastic ring 36 when the marking member 46 is taken along from the bottom of the axial slot 44. Accordingly, the marking member 46 adopts with high precision the initial or indicating position shown in FIG. 1, in which the end faces of the marking member 46 and of the indicator 40 are flush with each other.

When the tire pressure drops, the indicator 40 under the action of the spring 34 follows the corresponding displacement of the diaphragm 26 and moves into the interior or the sleeve 12 for a corresponding distance while the marking member 46 retains its initial position under the clamping action of the ring 36. To the viewer an upper portion of the marking member 46 then projects beyond the end face of the indicator 40. In particular when the colors of the two members are contrasting, this state indicating a loss in tire pressure is easily recognizable from afar. A corresponding position of the marking member 46 and of the indicator 40 of the valve cap 10 is illustrated in FIG. 2.

When the pressure drop in the tire has been noticed, the valve cap 10 is unscrewed and the tire pressure again increased to the desired value. At the valve cap 10 removed from the valve the marking member is again manually pressed into the axial slot 44 until it engages the bottom thereof. After repressurizing and renewed threading-on of the valve cap 10 onto the valve tube 18, the indicator 40 again moves the marking member 46 into its initial position and the elastic ring 36 retains the marking member 46 in the initial position thereof. As long as the end faces of the marking member 46 and of the indicator 40 are flush with each other, in which case the marking member is practically unnoticeable—especially when being of small thickness—the user may assume that the tire pressure corresponds to the desired value thereof.

By means of the shown spring washer 28 the diaphragm 26 may absolutely reliably and hermetically be retained at the inner wall of the sleeve 12. In the exceptional case of insufficient sealing or even destruction of the diaphragm 26, a complete escape of air from the tire may be prevented by the semi-spherical projection 52 formed on the underside of the disc 32 urging the diaphragm 26 or what is left thereof into the conical flare of the bore 16 and thereby sealing this bore 16. As the diaphragm is scarcely moved during operation, it is subjected only to small loads. If the diaphragm breaks nevertheless, this will normally happen in the region of the clamping location so that the central portion may continue to ensure emergency sealing.

The embodiments of the valve cap according to the invention which will be explained in the following with reference to FIGS. 4 to 8 comprise a hat or cap-shaped cover of transparent material permitting extension of the indicator and marking member and hermetically closing the end of the sleeve which is remote from the valve. In such valve caps an escape of air from the tire will be impossible even if the diaphragm or piston is damaged or if the seal between the diaphragm or piston and the inner wall of the sleeve is no longer tight.

Figure 4:
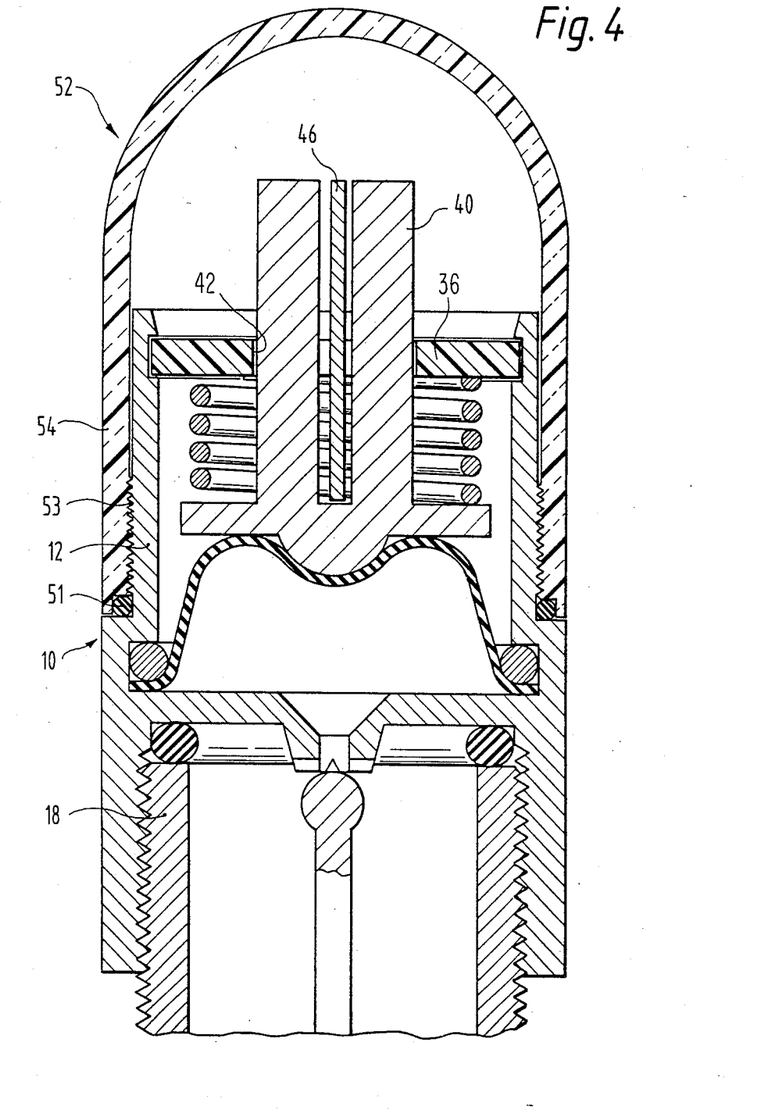
FIG. 4 is a sectional view of a further embodiment of a valve cap according to the invention.

FIG. 4 shows a further embodiment of a valve cap according to the invention. The valve cap 10, which in other respects is unchanged with respect to FIGS. 1, 2 and 3, additionally comprises a hat-shaped cover 52 hermetically sealing the end of the sleeve 12 which is remote from the valve tube 18. The hat-shaped cover 52 is made of a clear, transparent material, e.g. of a known polyacrylate. As shown, the cover engages the outer circumference of the sleeve 12 and is so dimensioned that the indicator 40 and the marking member 46 may be freely extended.

The tightness of the cover 52 relative to the sleeve 12 may be ensured in various ways. For instance, the tubular portion 54 of the cover 52 may have a slightly smaller internal diameter than the external diameter of the upper portion of the sleeve 12, and after elastic deformation the cover 52 is closely and tightly seated on this upper sleeve portion. A sealing fold may additionally be provided. Preferably, a threaded connection is provided, as schematically indicated at 53. In this case, the cover 52 may be unscrewed in order to push the marking member 46 back from its initial position, if required. A further sealing ring 51 inserted in the region of the end faces ensures hermetic sealing. According to a further alternative embodiment, a sealing weld or adhesive joint may be provided between the cover 52 and the sleeve 12.

Figure 5:
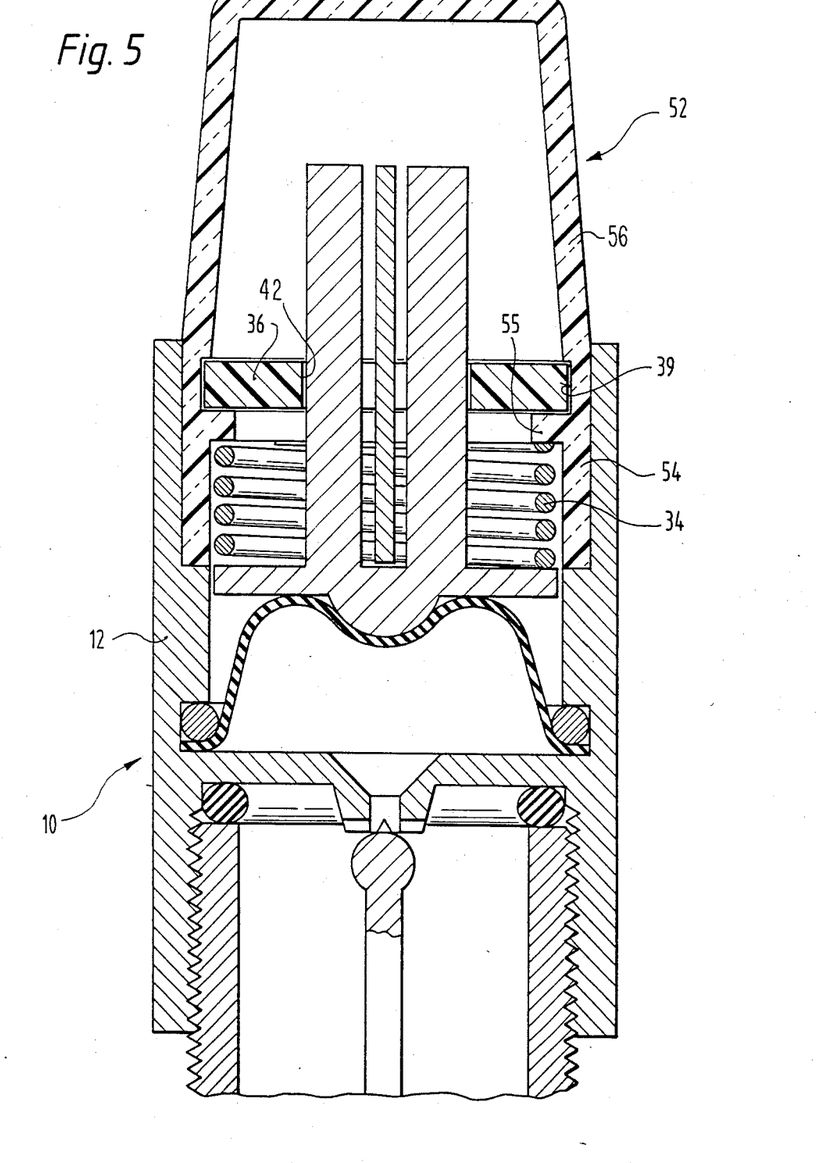
FIG. 5 is a sectional view of a further embodiment of a valve cap according to the invention.

FIG. 5 shows a further embodiment of a valve cap 10 according to the invention, in which the tubular portion 54 of the hat-shaped cover 52 sealingly engages the inner side of the upper portion of the sleeve 12. For increasing the tightness, preferably a weld joint is provided which may be produced e.g. by ultrasonic welding. The inner wall of the tubular portion 54 is formed with a continuous groove 39, which accommodates and retains the elastic ring 36. Beneath the groove 39 an extension 55 projects inwardly from the inner wall of the tubular portion 54 and forms the further spring seat for the spring 34. Thus, the elastic ring 36 is relieved from the pressure of the spring 34, whereby guiding of the indicator 40 and retaining of the marking member 46 are improved.

The hat-shaped cover 52 consists of the tubular portion 54 to which the closed hat portion 56 is joined integrally. As shown, the hat portion 56 has the configuration of a hollow cone portion flaring slightly towards the tubular portion 54. The entire cover 52 is made of clear, transparent plastics.

Figure 6:
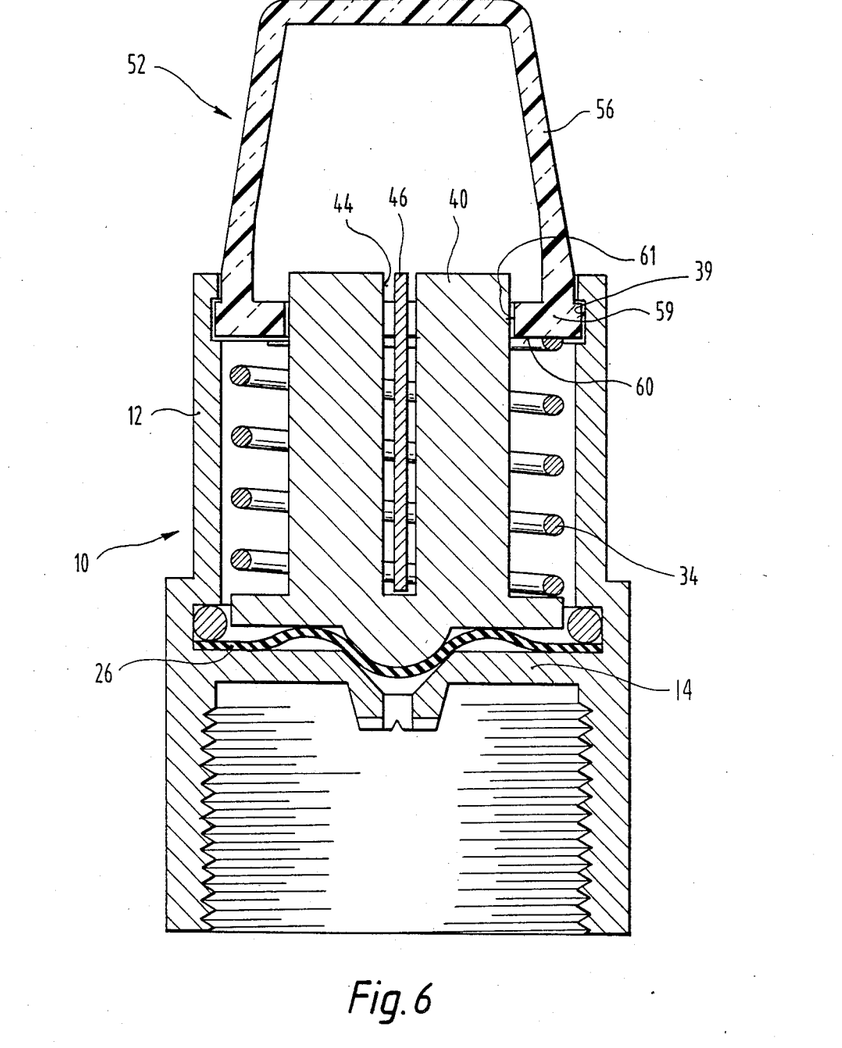
FIG. 6 is a sectional view of a further embodiment of a valve cap according to the invention.
Figure 7:
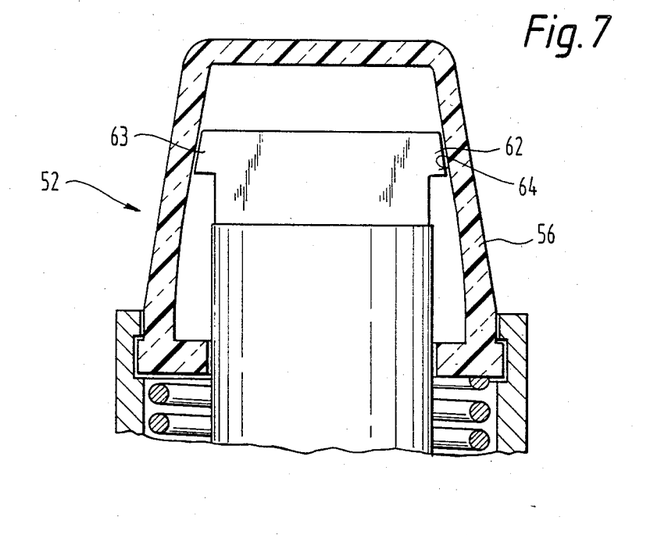
FIG. 7 shows the marking member of the valve cap according to FIG. 6 clamped to the inner wall of the hat-shaped cover.

FIGS. 6 and 7 show a further embodiment of a valve cap 10 according to the invention. The hat-shaped cover 52 substantially consists only of the closed hollow cone portion 56 the enlarged base 59 of which engages the continuous groove 39 in the inner wall of the upper portion of the sleeve 12 in force-fitted relationship. For insertion, the hollow cone portion 56 is elastically deformed and the base 59 is inserted into the groove 39. For increasing the tightness, a weld joint may additionally be provided between the sleeve material and the base material, if required. The underside 60 of the base 59 forms a seat for the spring 34. The inner side 61 of the base 59 forms a guide for the indicator 40 and the marking member 46.

In this embodiment the inner wall of the hollow cone portion 56 forms the return movement inhibitor for the marking member 46, as schematically indicated in FIG. 7. Again, the marking member 46 is a thin small plate of substantially rectangular configuration, which is movably held in the slot 44 in the indicator 40. In a modification, in the upper portion two extensions 62 and 63 (cf. FIG. 7) project beyond the central width of the marking member 46 so that the approximately T-shaped configuration of the marking member 46 shown in FIG. 7 results. The inclination of the side edge 64 of the extensions 62 and 63 may be matched to the inclination of the hollow cone portion 56.

FIG. 6 shows the valve cap 10 removed from a tire valve. The diaphragm 26 engages the transverse wall 14; the upper edge of the indicator 40 and of the marking member 46 are substantially flush with the upper edge of the sleeve 12. As soon as after threading-on of the valve cap onto a tire valve the desired tire pressure exists in the compressed-air chamber, the diaphragm 26 moves the indicator 40 outwardly, the bottom of the slot 44 taking the marking member 46 along. In its position corresponding to the desired tire pressure the indicator 40 urges the extensions 62 and 63 of the marking member 46 against the inner wall of the hollow cone portion 56, where they are retained in a force-fit or in frictional engagement, respectively. In this case, the inner wall of the hat-shaped cover takes over the function of the return movement inhibitor. In the event of a decrease in tire pressure, the spring 34 will again partially push the indicator 40 back while the hollow cone portion 56 will continue to retain the marking member 46 in its initial position. If the entire indicator 40 is e.g. made of black plastics and the marking member 46 is also made of a black material but is painted white on the side surfaces including the extensions 62 and 63, the backward movement of the indicator 40 will expose a white band on the retained marking member 46, which already with a width of a few tenths of millimeters will easily be visible through the transparent cover 52 and indicate the possibly occurring drop in the tire pressure. An easily visible contrast has also been achieved with a red marking member and a green indicator.

Figure 8:
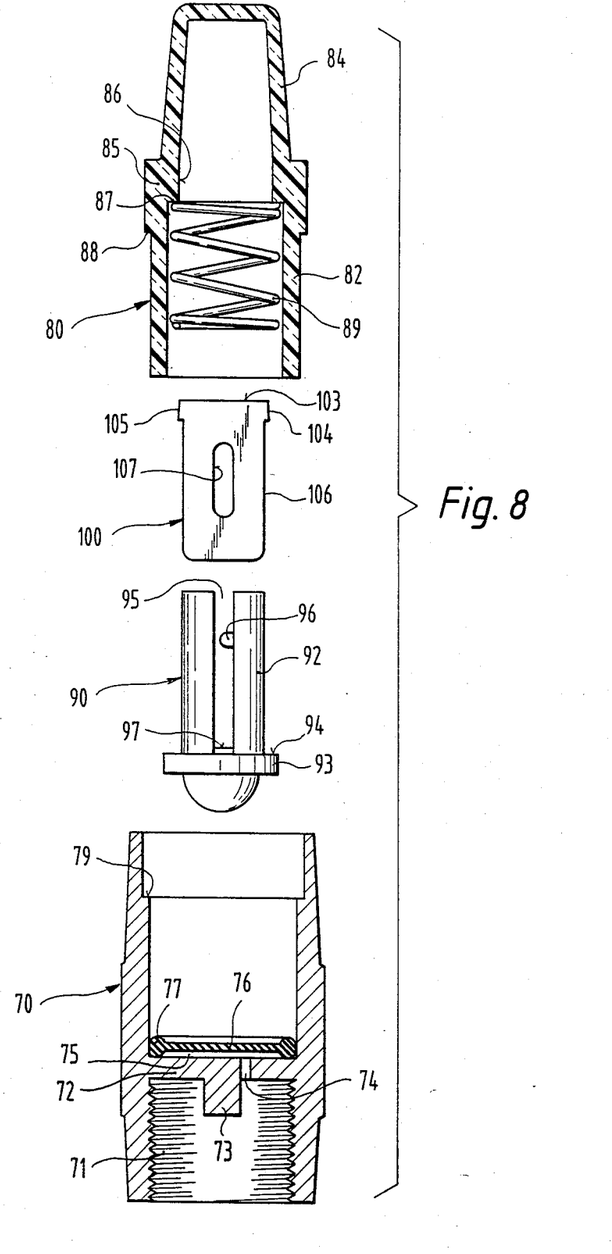
FIG. 8 is a sectional view of a further embodiment of a valve cap according to the present invention.

FIG. 8 shows a further embodiment of a valve cap according to the invention, which presently is particularly preferred, wherein individual components are shown in an exploded view. In its lower portion the sleeve 70 is provided with an internal thread 71 for threading the entire valve cap onto the valve of a pneumatic tire. In the threaded-on (operative) position the actuating member 73, which projects downwardly from the transverse wall 72, actuates a valve rod disposed within the valve tube so that the tire pressure may be passed on through a bore 74 provided laterally of the actuating member 73 and extending through the transverse wall 72 to the compressed-air chamber 75 thereabove. This compressed-air chamber 75 is defined by the transverse wall 72, on the one hand, and by the diaphragm 76, on the other hand. At its edge this diaphragm 76, which is substantially circular, is provided with a bead 77. In the assembled state, the end of the tubular portion 82 of the hat-shaped cover 80 urges this bead 77 against the transverse wall 72 so that the diaphragm hermetically engages the latter. Above the transverse wall 72 the inner wall of the sleeve 70 is provided with a stepped portion 79 for exact positioning of the hat-shaped cover 80.

The sleeve 70 may be an injection molded body of tough, impact-resistant plastics such as e.g. high density polyethylene.

The hat-shaped cover 80 consists of the tubular portion 82 and the closed hat portion 84 integrally formed therewith. The entire cover 80 is made of a clear, transparent material, e.g. of a known polyacrylate. Where the hat portion 84 merges into the tubular portion 82 a continuous projection 85 projects inwardly from the latter, the inner wall 86 of said projection serving to guide the rod portion 92 of the indicator 90. The underside 87 of the projection 85 forms the one spring seat for the spring 89. The outer wall of the tubular portion 82 is provided with a projecting shoulder 88, which upon insertion of the cover 80 in the sleeve 70 engages the stepped portion 79 in the inner wall thereof. After completion of the assembly of all components, ultrasonic welding between the sleeve 70 and the cover 80 is carried out in this region.

The indicator 90 consists of the rod portion 92 and the disc 93 which at the underside of said rod portion 92 is integrally formed therewith, the upper side 94 of the projecting disc edge forming the other seat for the spring 89. Along its major longitudinal portion the rod portion 92 is formed with a slot 95 extending axially thereto. A lug 96 projects from the one slot wall almost to the other slot wall. Alternatively, instead of the lug 96, there may be provided a pin bridging the slot 95 and fixed in aligned bores in the slot walls. The slot 95 is of sufficient width to permit easy movement of the marking member 100 in the form of a thin small plate within the slot. In the assembled state, the lower edge of the marking member 100 rests on the bottom 97 of the slot 95 and, when pressure is applied to the compressed-air chamber 75, the marking member 100 together with the indicator 90 is moved towards the hat-shaped cover 80 in the axial direction relative to the sleeve 70.

The marking member 100 consists of a thin small plate of substantially rectangular configuration. In the region of its upper edge 103 two extensions 104 and 105 slightly project beyond the longitudinal edges 106 on either side. With these extensions 104 and 105 the marking member 100, which has been moved to its initial position will be held in frictional engagement with the inner wall of the hollow cone portion 84 even if, after a pressure decrease in the compressed-air chamber 75, the spring 89 has partially returned the indicator 90, as thoroughly explained above with reference to FIG. 7. The marking member 100 has formed therein the elongated slot 107 into which the lug 96 projects after insertion of the marking member 100 into the slot 95 of the indicator 90.

Preferably the spring 89 is a coil spring and has such a coil circumference that, on the one hand, the spring may be inserted with a clearance into the tubular portion 82 of the cover 80 and, on the other hand, it surrounds the rod portion 92 of the indicator 90 with a clearance. In an exemplary embodiment the diaphragm 76 and the spring 89 are so matched to one another that a variation of the pressure in the compressed-air chamber 75 by 0.1 bar displaces the indicator 90 by approx. 0.05 to 0.20 mm.

As explained above, the present invention provides a valve cap for pneumatic tires which can provide optical indication of a pressure decrease in the pneumatic tire. The use of the valve cap is most simple because it need merely be threaded onto the valve of the pneumatic tire. Thereupon, the indicator and the marking member automatically adopt their initial positions. Due to the extremely simple structure, these valve caps are absolutely reliable—even in bad weather conditions and at maximum driving speeds of 200 km/h and more—as has been proven by long-term tests. The valve cap according to the present invention meets the requirements for valves of pneumatic tires according to DIN 7780. The extremely simple structure and the low number of separate independent components permit manufacture and assembly of such valve caps in mass production at minimum costs.

As set out above, the invention has been explained in detail with reference to preferred embodiments. It is apparent to those skilled in the art that various changes and modifications of these explained embodiments may be made without departing from the spirit of the invention. For instance, the indicator may be formed integrally with the diaphragm or piston, respectively. Especially an integral embodiment of the indicator and the piston promises advantages because a further independent component may be omitted without risking an impairment of the efficiency.

Such and further changes and modifications of the explained embodiments which are recognizable to those skilled in the art upon study of the above papers shall also be covered by the present invention as long as they can be subsumed under the subject-matter of the following patent claims and/or the equivalents thereof.

I claim:

1. A valve cap for pneumatic tires having a valve tube with a valve mounted therein, the valve cap comprising a sleeve mountable on the valve tube and including an actuating member for opening the valve when the sleeve is mounted on the valve tube, a compressed-air chamber disposed within the sleeve and communicating with the interior of the tire through the open valve, the compressed-air chamber including a movable wall structure sealing the compressed-air chamber relative to ambient pressure, said movable wall structure moving in a first axial direction in response to an increase in pressure in the compressed-air chamber, an indicator mounted for axial movement through the sleeve and actuated by the movable wall structure, a marking member cooperatively arranged with the indicator for movement in the first axial direction through the sleeve, a return movement inhibitor operatively associated with the marking member for inhibiting movement thereof, and a spring cooperating with the indicator and biased toward the opposite axial direction whereby an increase in pressure in the compressed-air chamber axially moves the indicator and marking member in the first axial direction relative to the sleeve and a decrease in pressure in the compressed-air chamber axially moves the indicator in the opposite axial direction relative to the sleeve while the return movement inhibitor retains the marking member in its position relative to the sleeve.

2. A valve cap according to claim 1 wherein said return movement inhibitor is configured as a brake.

3. A valve cap according to claim 2 wherein the return movement inhibitor configured as a brake comprises a ring through which said indicator extends with a clearance whereas said marking member extends therethrough in frictional engagement.

4. A valve cap according to claim 3 wherein said ring is made of an elastically deformable material.

5. A valve cap according to claim 3 wherein said ring closes the end face of said sleeve.

6. A valve cap according to claim 1 further comprising a hat-shaped cover of a transparent material hermetically sealing the end of said sleeve which is remote from the valve while permitting extension of said indicator and said marking member and further comprising means for enabling at least partial return of said marking member upon complete pressure relief of said compressed-air chamber.

7. A valve cap according to claim 6 wherein said cover comprises a hat portion and a tubular portion integrally formed therewith and said tubular portion is insertable into said sleeve.

8. A valve cap according to claim 7 wherein the outer wall of said tubular portion and the inner wall of said sleeve are welded to each other at least in a continuous annular zone.

9. A valve cap according to claim 7 wherein said tubular portion is formed with an inwardly projecting spring seat.

10. A valve cap according to claim 7 wherein the movable wall structure comprises a diaphragm having a peripheral bead, the sleeve includes a transverse wall, and the open end of said tubular portion urges the peripheral bead of said diaphragm against the transverse wall of said sleeve.

11. A valve cap according to claim 7 wherein said hat portion substantially has the configuration of a hollow cone portion slightly flaring towards said tubular portion.

12. A valve cap according to claim 7 wherein the return movement inhibitor comprises the inner wall of said hat portion.

13. A valve cap according to claim 6 wherein the displacement of said indicator which takes place upon complete pressure relief of said compressed-air chamber causes also an at least partial return of said marking member.

14. A valve cap according to claim 1 wherein said indicator comprises a rod portion which has at one end thereof a projecting disc edge serving as a spring seat, said rod portion including a slot extending axially thereof, and wherein said marking member comprises a small plate movable axially relative to said rod portion and disposed within said slot.

15. A valve cap according to claim 14 wherein said marking member in the form of a small plate includes two parallel longitudinal edges and projects beyond the axial slot and wherein these projecting edges are adapted to frictionally engage the return movement inhibitor.

16. A valve cap according to claim 15 wherein the length of said marking member corresponds to the length of said axial slot.

17. A valve cap according to claim 14 further comprising a hat-shaped cover of a transparent material including a hat portion and a tubular portion integrally formed therewith, said hat portion substantially having the configuration of a hollow cone portion slightly flaring towards said tubular portion and said tubular portion being insertable into said sleeve, and wherein the dimensions of said marking member in the form of a small plate substantially correspond to the width and length of said slot and in the region of its upper edge said small plate includes two opposed extensions projecting beyond the cross-section of said rod portion, said extensions being adapted to frictionally engage the inner wall of said hollow cone portion.

18. A valve cap according to claim 17 wherein said small plate has formed therein an elongated slot and wherein said indicator includes a projection extending into said elongated slot.

19. A valve cap according to claim 1 wherein said actuating member comprises a projection which is fixedly provided within said sleeve and always keeps the valve mounted in the valve tube in the open position when said sleeve is mounted on said valve tube.

20. A valve cap according to claim 1 further comprising means for sealing the compressed-air chamber from the interior of the tire when the tire pressure falls to a certain value.

21. A valve cap according to claim 20 wherein the compressed-air chamber communicates with the interior of the tire through an aperture and wherein the sealing means comprises a protrusion mounted to the indicator which sealingly seats within the aperture when the tire pressure falls to a certain value.

22. A valve cap for pneumatic tires having a valve tube with a valve mounted therein, the valve cap comprising a sleeve mountable on the valve tube and including an actuating member for opening the valve when the sleeve is mounted on the valve tube, a compressed-air chamber disposed within the sleeve and communicating with the interior of the tire through the open valve, the compressed-air chamber including a movable wall structure sealing the compressed-air chamber relative to ambient pressure, an indicator mounted for axial movement through the sleeve and actuated by the movable wall structure, said indicator including a rod portion having a slot extending axially thereof and at one end a projecting disc edge serving as a spring seat, a marking member operatively associated with the indicator, said marking member comprising a small plate disposed within the slot of the indicator and movable axially relative to the rod portion of the indicator, said small plate having two parallel longitudinal edges projecting beyond the slot, a return movement inhibitor operatively associated with the marking member, said projecting edges of the marking member being adapted to frictionally engage the return movement inhibitor, and a spring cooperating with the indicator and biased toward the actuating member wherein an increase in pressure in the compressed-air chamber axially moves the indicator and marking member relative to the sleeve and a decrease in pressure in the compressed-air chamber axially moves the indicator toward the actuating member relative to the sleeve while the return movement inhibitor retains the marking member in its position relative to the sleeve.

23. A valve cap according to claim 22 wherein the length of the marking member corresponds to the length of the axial slot in the indicator.

24. A valve cap for pneumatic tires having a valve tube with a valve mounted therein, the valve cap comprising a sleeve mountable on the valve tube and including an actuating member for opening the valve when the sleeve is mounted on the valve tube, a hat-shaped cover of a transparent material including a hat portion and a tubular portion integrally formed therewith, said hat portion substantially having the configuration of a hollow cone portion slightly flaring toward the tubular portion and the tubular portion being insertable into the sleeve, a compressed-air chamber disposed within the sleeve and communicating with the interior of the tire through the open valve, the compressed-air chamber including a movable wall structure sealing the compressed-air chamber relative to ambient pressure, an indicator mounted for axial movement through the sleeve and actuated by the movable wall structure, said indicator including a rod portion having a slot extending axially thereof and at one end a projecting disc edge serving as a spring seat, a marking member operatively associated with the indicator, said marking member comprising a small plate disposed within the slot of the indicator and movable axially relative to the rod portion of the indicator, said small plate having dimensions substantially corresponding to the width and length of the slot and including in the region of its upper edge two opposed extensions projecting beyond the cross-section of the rod portion of the indicator, a return movement inhibitor operatively associated with the marking member and comprising the inner wall of the hollow cone portion of the hat-shaped cover, said extensions of the marking member being adapted to frictionally engage the inner wall of the hollow cone portion, and a spring cooperating with the indicator and biased toward the actuating member whereby an increase in pressure in the compressed-air chamber axially moves the indicator and marking member relative to the sleeve and a decrease in pressure in the compressed-air chamber axially moves the indicator toward the actuating member relative to the sleeve while the return movement inhibitor retains the marking member in its position relative to the sleeve.

25. A valve cap according to claim 24 wherein the small plate has formed therein an elongated slot and wherein the indicator includes a projection extending into the elongated slot of the small plate.

* * * * *